No. 854,373. PATENTED MAY 21, 1907.
T. W. MORGAN.
CENTRIFUGAL CREAM SEPARATOR.
APPLICATION FILED DEC. 14, 1906.

WITNESSES:

INVENTOR
Thomas W. Morgan,
BY
ATTORNEY

UNITED STATES PATENT OFFICE.

THOMAS W. MORGAN, OF WATERLOO, IOWA, ASSIGNOR TO WILBUR W. MARSH, OF WATERLOO, IOWA.

CENTRIFUGAL CREAM-SEPARATOR.

No. 854,373.     Specification of Letters Patent.     Patented May 21, 1907.

Application filed December 14, 1906. Serial No. 347,787.

*To all whom it may concern:*

Be it known that I, THOMAS W. MORGAN, a citizen of the United States, residing at Waterloo, in the county of Blackhawk and State of Iowa, have invented certain new and useful Improvements in Centrifugal Cream-Separators, of which the following is a specification.

My invention relates to improvements in centrifugal cream separators, and the object of my improvement is to provide an adjustable exit for the escaping skimmed milk so arranged as to permit of any desired change in the density of the separated cream. This object I have accomplished by the means which are hereinafter described and claimed, and which are illustrated in the accompanying drawings, in which—

Figure 1:
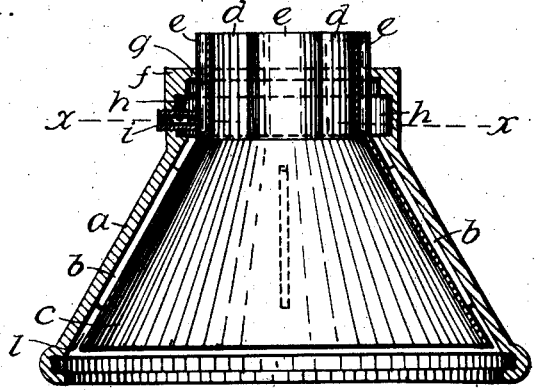
Figure 2:
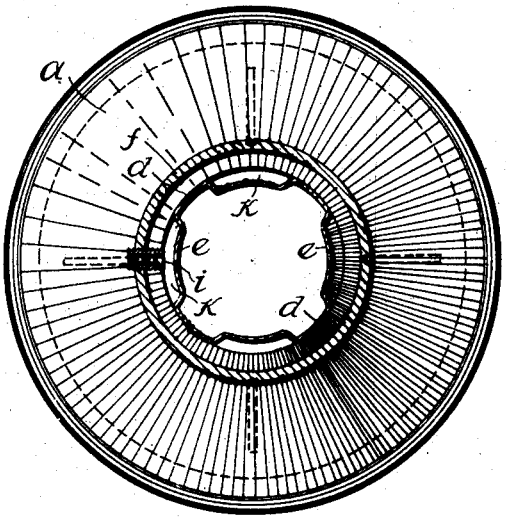

Figure 1 is a central vertical axial section of the conical cover of a centrifugal cream separator bowl provided with my improved adjustable milk exit screw and auxiliary means for permitting any desired change in the density of the escaping separated cream, and Fig. 2 is an upper plan view of such cover, its upper cylindrical portion being shown in horizontal section taken on a line $xx$ in Fig. 1.

Similar letters refer to similar parts throughout the several views.

The conical cover $a$ has an upper cylindrical extension $f$ provided with an inwardly extending flange or fillet $g$, the inner periphery of said cylinder $f$ also having an annular recess $h$ in communication with the space $l$ between said cover and the inner cone $c$. The removable hollow inner cone $c$ is spaced apart from the inner periphery of the cover $a$ by means of a plurality of lugs $b$ extending inward from said cover. Said lugs are short enough so as to not interfere with the equal dissemination of the stratum of skimmed milk over the whole inner peripheral surface of the cover $a$. The upward hollow portion of the inner cone $c$ is in the form of a cylinder having a plurality of inwardly directed crimps $e$, the fillet $g$ of said cylinder $f$ being made to conform and contact throughout with the outer surface of the inner crimped cylinder above described. A perforated milk exit screw $i$ is fitted within an interiorly threaded opening in the cylinder $f$, and the inner end of said screw may be made to approach more or less closely to the crimped-in portion $e$ of the cylinder $d$.

The stratum of escaping skimmed milk which passes over the inner periphery of the cover $a$ is very shallow in depth, and when the screw $i$ has been adjusted so that its inner end lies flush with the inner surface of the recess $h$ the bowl will skim so as to leave the outer line of the cream zone at its outermost extent, and the escaping cream is of greatest density. As the inner end of the screw $i$ is adjusted to approach more closely the cylinder $d$ the stratum of skimmed milk has to thicken in order to reach the inner end thereof and as such stratum increases in thickness the cream zone is pushed back toward the axis of the bowl, which causes the escaping separated cream to be of less density or richness in butter fat comparatively for equal cubical portions.

The object of crimping in the cylinder $d$ to form the offset portion $e$ is to permit the inner end of the screw $i$ to pass to a position where its inner face lies in the same vertical line as the inner surface of the cream conduit $d$. The offset $e$ is sufficient, as shown in Fig. 2, to permit of this last adjustment of the screw $i$ and also leave a sufficient space between said screw and said offset $e$ to permit of the free passage of milk therebetween. The adjustment of the screw $i$ to bring the vertical surface of its inner end into the same vertical line as that of the inner surface of the cream conduit $d$ is especially effective in that it allows the maximum adjustment for effecting a less density in the separated cream. The cone $c$, when the cover $a$ has been removed from the bowl, may be easily removed for cleaning.

Having described my invention, what I claim as new, and desire to secure by Letters Patent, is—

1. In a centrifugal cream separator, the combination with the removable cover containing a milk exit whose inner receiving end is adjustable toward and from the axis of the bowl, of an inner cone contained in and spaced away from the said cover and adapted to separate the issuing streams of separated milk and cream, the cylindrical top of said cone being crimped inward at a point nearest the receiving end of said adjustable exit to permit said receiving end to lie in the same vertical line as the outer line of the cream stratum.

2. In a centrifugal cream separator, the combination with the removable cover provided with an inner annular recess, and containing a milk exit opening into said recess whose inner receiving end is adjustable toward and from the axis of the bowl, of an inner cone contained in and spaced away from the said cover and adapted to separate the issuing streams of separated milk and cream, the cylindrical top of said cone being crimped inward at a point nearest the receiving end of said adjustable exit to permit said receiving end to lie in the same vertical line as the outer line of the cream stratum.

In testimony whereof he affixes his signature in presence of two witnesses.

THOMAS W. MORGAN.

Witnesses:
M. E. KENNEDY,
G. C. KENNEDY.